(12) United States Patent
Muth (10) Patent No.: US 11,520,600 B2
(45) Date of Patent: Dec. 6, 2022

(54) CONTROLLER AREA NETWORK TRANSCEIVER AND CONTROLLER

(71) Applicant: NXP B.V., Eindhoven (NL)

(72) Inventor: Matthias Berthold Muth, Stelle (DE)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 17/248,224

(22) Filed: Jan. 14, 2021

(65) Prior Publication Data

US 2021/0224079 A1    Jul. 22, 2021

(30) Foreign Application Priority Data

Jan. 17, 2020  (EP) .................................. 20152539

(51) Int. Cl.
  *G06F 9/4401*  (2018.01)
  *H04B 1/38*  (2015.01)
  *H04L 12/40*  (2006.01)
  *H04L 43/16*  (2022.01)

(52) U.S. Cl.
  CPC ............ *G06F 9/4418* (2013.01); *H04B 1/38* (2013.01); *H04L 12/40* (2013.01); *H04L 43/16* (2013.01); *H04L 2012/40215* (2013.01); *H04L 2012/40273* (2013.01)

(58) Field of Classification Search
  CPC ........... H04B 1/38; H04L 12/40; H04L 43/16; H04L 2012/40215; H04L 2012/40273; H04L 2012/40208; G06F 9/4418
  See application file for complete search history.

(56) References Cited

U.S. PATENT DOCUMENTS

| | | | |
|---|---|---|---|
| 6,438,462 B1* | 8/2002 | Hanf ..................... | G06F 1/3203 700/297 |
| 10,284,388 B2* | 5/2019 | Kishigami .......... | H04L 25/0272 |
| 10,445,107 B2 | 10/2019 | Sun et al. | |
| 10,454,705 B2* | 10/2019 | Hartwich ............ | H04L 25/0278 |
| 10,785,066 B1 | 9/2020 | van Dijk | |
| 10,791,002 B2 | 9/2020 | de Haas et al. | |
| 10,826,719 B2 | 11/2020 | Muth et al. | |
| 10,838,906 B1 | 11/2020 | van Dijk | |
| 11,038,508 B2 | 6/2021 | de Haas et al. | |
| 11,061,844 B2 | 7/2021 | de Haas et al. | |
| 2004/0119517 A1 | 6/2004 | Pauletti et al. | |
| 2012/0051241 A1* | 3/2012 | Mori .................. | H04L 12/40039 370/465 |
| 2012/0297105 A1 | 11/2012 | Elend | |

(Continued)

FOREIGN PATENT DOCUMENTS

| | | |
|---|---|---|
| DE | 102005037723 A1 | 2/2007 |
| EP | 3 373 526 A1 | 12/2018 |
| WO | 2018/104929 A1 | 6/2018 |

OTHER PUBLICATIONS

"AU5790 Single wire CAN transceiver", Integrated Circuits Data sheet, Philips Semiconductors, 20 pgs, (May 18, 2001).

(Continued)

*Primary Examiner* — Oussama Roudani (57) ABSTRACT

The disclosure relates to a controller area network, CAN, transceiver and a CAN controller. The CAN transceiver is configured to: compare a signal from the CAN bus with a negative threshold level; and provide a wake-up indication to the CAN controller based on the signal matching a predetermined pattern of one or more periods in which the signal is less than the negative threshold level. The CAN controller is configured to provide instructions to transmit a wake-up indication on the CAN bus.

16 Claims, 6 Drawing Sheets

(56) References Cited

U.S. PATENT DOCUMENTS

| | | | |
|---|---|---|---|
| 2014/0350772 A1 | 11/2014 | Saito | |
| 2018/0198481 A1* | 7/2018 | Bavois | H04L 12/40032 |
| 2018/0205572 A1 | 7/2018 | Kishigami et al. | |
| 2018/0227145 A1 | 8/2018 | Brochi et al. | |
| 2018/0309590 A1 | 10/2018 | Beckmann et al. | |
| 2019/0017311 A1* | 1/2019 | McGettrick | E05F 15/622 |
| 2019/0215233 A1 | 7/2019 | Huang et al. | |
| 2020/0213351 A1 | 7/2020 | Shin et al. | |
| 2020/0267018 A1* | 8/2020 | Gupta | H04L 12/40013 |
| 2020/0382340 A1 | 12/2020 | Berthold | |
| 2020/0403823 A1 | 12/2020 | van Dijk | |
| 2020/0412583 A1* | 12/2020 | Walker | H04L 25/0272 |
| 2021/0120017 A1 | 4/2021 | Antonsson | |

OTHER PUBLICATIONS

"Road vehicles—Controller area network (CAN)—Part 3: Low-speed, fault-tolerant medium-dependent interface", ISO 11898-3-2006, IEEE-Draft, 32 pgs. (Jun. 1, 2006).

"Road vehicles—Controller area network (CAN)—Part 2: High-speed medium access unit", International Standard ISO 11898-2-2016, 38 pgs. (Dec. 15, 2016).

"TLE9250X Z8F57889425", Infineon, 17 pgs., retreived from the internet at: https://www.infineon.com/dgdl/Infineon-Z8F57889425_TLE9250X-ApplicationNotes-v01_40-EN.pdf?fileId=5546d4625debb399015e14d43ba35991 (Jul. 27, 2020).

NXP; "UJA1166A High-speed CAN transceiver with 5 V LDO and Sleep mode—Rev. 1"; Product Data Sheet 35 pages (Aug. 2019).

NXP; "TJA1055 Enhanced fault-tolerant CAN transceiver, Rev. 5"; Product data sheet; 26 pages (Dec. 6, 2013).

International Organization for Standardization; Draft International Standard ISO 11898-3 .2—Road vehicles—Controller area network (CAN)—Part 3: Low-speed, fault-tolerant, medium dependent interface; 30 pages (2005).

CAN in Automation (CiA) e.V.; "Draft Specification Proposal CiA 601-4, Version 2.1.0, CAN FD node and system design, Part 4: Signal Improvement"; 20 pages (Oct. 7, 2021).

U.S. Appl. No. 17/660,393, filed Apr. 22, 2022, not yet published, 83 pages.

U.S. Appl. No. 17/249,674; 20 pages (filed Mar. 9, 2021).

Non Final Office Action; U.S. Appl. No. 17/249,674; 16 pages (dated Mar. 9, 2021).

U.S. Appl. No. 17/804,936; 30 pages (filed Jun. 1, 2022).

U.S. Appl. No. 17/805,122; 34 pages (filed Jun. 2, 2022).

\* cited by examiner

SECOND EMBODIMENT

CONTROLLER AREA NETWORK TRANSCEIVER AND CONTROLLER

CROSS-REFERENCE TO RELATED APPLICATIONS

This application claims the priority under 35 U.S.C. § 119 of European patent application no. 20152539.1, filed on Jan. 17, 2020, the contents of which are incorporated by reference herein.

The present disclosure relates to a CAN transceiver, a CAN controller, a CAN device, a CAN network and associated methods of operation.

In-vehicle network (IVN) busses, such as CAN (Controller Area Network), CAN FD (CAN with Flexible Data-Rate), LIN (Local Interconnect Network), FlexRay, Ethernet based network busses, and other types, can be used for communications within vehicles. For example, controller area network (CAN) bus is a message-based communications bus protocol that is often used within automobiles. A CAN bus network may include multiple bus devices, so called nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The CAN bus protocol is used to enable communications between the various bus devices. The data link layer of the CAN protocol is standardized as International Standards Organization (ISO) 11898-1:2003. CAN Flexible Data-Rate or "CAN FD," which is an extension of the standardized CAN data link layer protocol and is meanwhile integrated into the ISO11898-2:2016 standard, can provide higher data rates. But the standardized CAN data link layer protocol is still in further process of being extended to provide even higher data rates. A further extension, referred to as CAN XL, with a new level scheme allowing even higher data rates is in the definition phase discussed under CiA610 (CAN in Automation), is discussed in draft specification CiA610-1, and is moving towards standardization in the form of either a further update of the existing ISO11898 standards or a new standard.

According to a first aspect of the present disclosure there is provided a controller area network, CAN, transceiver for communicating with a CAN controller and a CAN bus, the CAN transceiver configured to:
compare a signal from the CAN bus with a negative threshold level; and
provide a wake-up indication to the CAN controller based on the signal matching a predetermined pattern of one or more periods in which the signal is less than or equal to the negative threshold level.

In this way, partial networking functionality may be provided efficiently and cost-effectively for a CAN XL system, for example.

The CAN transceiver may be a CAN XL transceiver. The signal from the CAN bus may be a differential signal. The threshold may be negative in the reference frame of the CAN bus. The CAN transceiver may be configured to compare a signal from the CAN bus with first, second and third threshold levels. The third threshold level may be the negative threshold level. The first, second and third threshold levels may be respective threshold voltage levels. The first threshold level for the signal from the CAN bus may be positive. The first threshold level may comply with ISO 11898-2:2016.

In one or more embodiments, the CAN transceiver comprises:
a comparator configured to compare a differential voltage signal from the CAN bus with the negative threshold level; and
a wake-up filter configured to receive the output of the comparator and determine whether the output corresponds with the predetermined pattern.

In one or more embodiments, the predetermined pattern is a single period having a predetermined duration.

In one or more embodiments, the predetermined duration is greater than a bit stuffing period within the data phase of a CAN frame.

The bit stuffing period may be the bit stuffing rate multiplied by the bit period at the slowest data transfer rate of the CAN protocol that the transceiver is configured to operate in accordance with. A bit stuffing rate may be once every 15 bits for the protocol. The slowest data transfer rate for the protocol may be 500 kbps.

The predetermined duration may be greater than one of 30 microseconds, 35 microseconds, 50 microseconds, 100 microseconds and 200 microseconds. The predetermined duration may be less than one of 31 microseconds, 35 microseconds, 50 microseconds, 100 microseconds, 200 microseconds and 500 microseconds.

In one or more embodiments, the period is at the end of a CAN frame.

In one or more embodiments, the period is at the end of the data phase of a CAN frame.

In one or more embodiments, a data phase of a CAN frame consists exclusively of the exceptional symbol and the CAN frame does not include any CAN data traffic.

The data phase of the CAN frame may consist exclusively of the predetermined pattern. The data phase of the CAN frame comprising the predetermined pattern may not include any further data, or any CAN data. The data phase of the CAN frame may be co-extensive with the predetermined pattern. The predetermined pattern may be provided in a CAN frame that does not have a data phase.

In one or more embodiments, the predetermined pattern comprises a plurality of separate periods in which the signal is less than or equal to the third threshold level.

In one or more embodiments, the wake-up filter is configured to determine a first period of time at which the bus is below the third threshold level. The wake-up filter may be configured to determine a second period of time at which the bus is not below the third threshold level. The wake-up filter may be configured to determine whether the signal matches a predetermined pattern based on a ratio of the first period of time against the second period of time matching a predetermined ratio. The predetermined ratio may be defined in accordance with a bit stuffing rule of CAN XL. The wake-up filter may be configured to determine whether the signal matches the expected ratio by measuring and comparing the lengths of both phases (first and second periods) making the method baud rate independent.

In one or more embodiments, the second period of time follows immediately after the first period of time. The wake-up filter may be configured to determine that the signal matches the predetermined pattern when a predetermined number of cycles of the first and second periods have been detected in which the ratio of the first period of time against the second period of time matches the predetermined ratio.

In one or more embodiments, the predetermined number is determined by counting or timing the number of consecutive cycles at which the ratio matches the predetermined ratio. The overall wake-up filter may count the number of detected symbols. The overall wake-up filter may measure an absolute time of detected consecutive symbols.

In one or more embodiments, the predetermined pattern is determined for, or within, a single CAN frame or a single CAN data frame. The predetermined period may be determined, or integrated over a plurality of CAN frames or a plurality of CAN data frames.

In one or more embodiments, predetermined pattern corresponds to legal data in the CAN protocol, which may be the CAN XL protocol.

According to a second aspect of the present disclosure there is provided a controller area network, CAN, controller for driving a CAN transceiver configured to provide a signal to a CAN bus below a negative threshold level, the CAN controller configured to:

provide instructions to transmit a wake-up indication on the CAN bus, in which the wake-up indication comprises a signal having a predetermined pattern of one or more periods in which the signal is less than or equal to the threshold level.

The CAN controller may be a CAN XL controller. The protocol implemented by the CAN controller may comprise any features of the CAN protocol described with reference to a CAN transceiver described herein. For example, the instructions may be instructions to transmit a may be signal on the CAN bus in accordance with first, second and third threshold levels, in which the first threshold level may comply with ISO 11898-2:2016 and the third threshold level may be the negative threshold level.

According to a third aspect of the present disclosure there is provided a controller area network (CAN) node comprising a CAN transceiver and a CAN controller as described herein.

According to a further aspect of the present disclosure there is provided a method for operating a controller area network, CAN, transceiver communicating with a CAN controller and a CAN bus, the method comprises:

comparing a signal from the CAN bus with a negative threshold level; and providing a wake-up indication to the CAN controller based on the signal matching a predetermined pattern of one or more periods in which the signal is less than or equal to the negative threshold level.

According to a further aspect of the present disclosure there is provided a method for operating a controller area network, CAN, controller for driving a CAN transceiver configured to provide a signal to a CAN bus below a negative threshold level, the CAN controller configured to:

provide instructions to transmit a wake-up indication on the CAN bus, in which the wake-up indication comprises a signal having a predetermined pattern of one or more periods in which the signal is less than or equal to the threshold level.

According to a further aspect of the present disclosure, computer program code is provided. There may be provided a non-transient computer readable medium comprising the computer program code. Computer program code may be provided that is configured to cause a processor to execute any method disclosed herein. Computer program code may be configured to cause a processor of a CAN controller to provide instructions to a CAN transceiver to transmit a wake-up indication on the CAN bus, the wake-up indication comprising a signal having a predetermined pattern of one or more periods in which the signal is less than or equal to the third threshold level.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which:

FIG. 1b shows an example schematic block diagram of a node on the controller area network (CAN) of FIG. 1a;

Figure 1A:
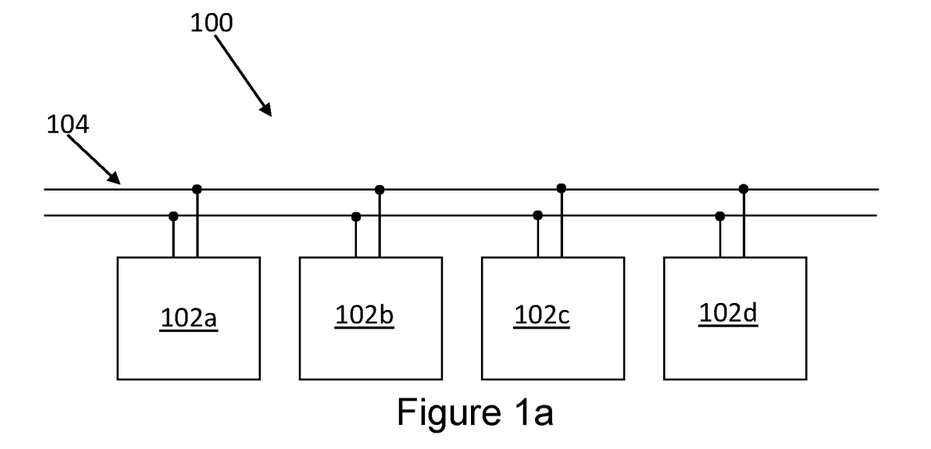
FIG. 1a shows an example schematic block diagram of a controller area network (CAN)

FIG. 1a illustrates an example schematic block diagram of a controller area network (CAN) 100 comprising a plurality of CAN devices, or nodes, 102a-d, which are each coupled to a CAN bus 104. The CAN bus 104 comprises two signal lines for communicating a differential signal between the plurality of CAN devices 102a-d.

Figure 1B:
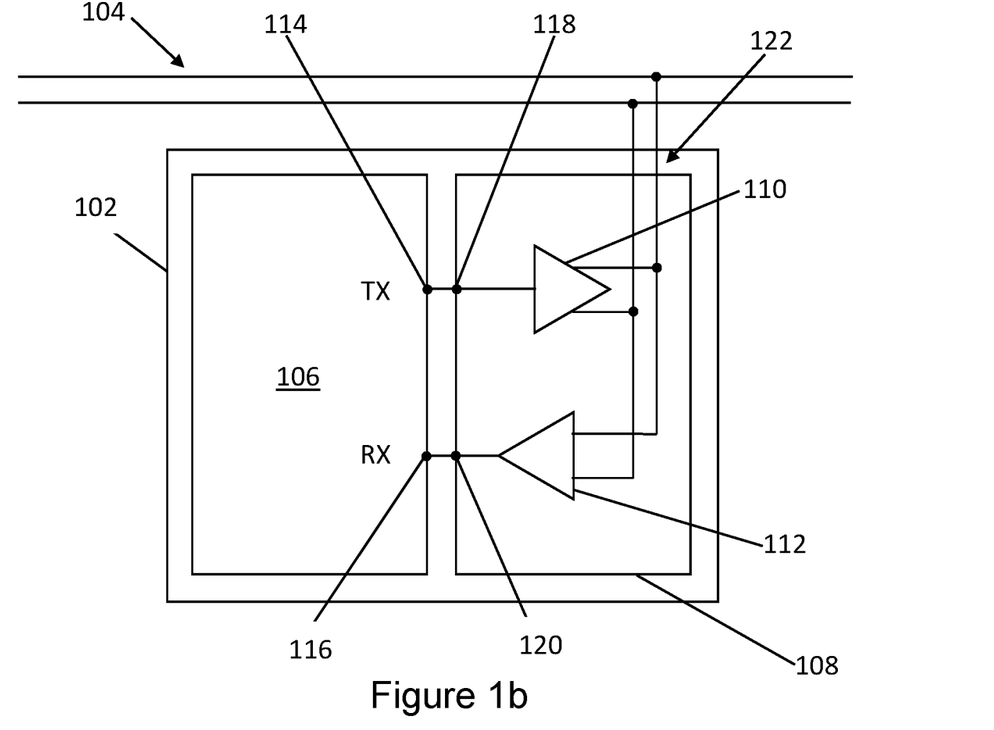

FIG. 1b illustrates a schematic block diagram of a CAN device 102 coupled to the CAN bus 104. The CAN device 102 comprises a CAN controller 106 and a CAN transceiver 108. The CAN controller 106 may be implemented by a processor, such as a microprocessor, configured to implement a CAN protocol of operation within the CAN network 100. The CAN transceiver 108 interfaces the CAN controller 106 with the CAN bus 104. In some examples, the CAN transceiver 108 can operate with no, or limited, circuitry for understanding or implementing the CAN protocol and so may be of relatively limited power consumption compared to the processor of the CAN controller 106.

The CAN controller 106 has a transmit output 114 and a receive input, 116. The CAN transceiver 108 has a transmit input 118, a receive output 120 and a bus terminal 122, which may also be referred to as a bus port. The bus terminal 122 is coupled to the two signal lines of the CAN bus 104. The transmitter output 114 of the CAN controller 106 is coupled to the transmit input 118 of the CAN transceiver 108. The receive input 116 of the CAN controller 106 is coupled to the receive output 120 of the CAN transceiver 108.

The CAN transceiver 108 comprises a transmitter unit 110 and a receiver unit 112. The transmitter unit 110 has an input coupled to the transmit input 118 of the CAN transceiver 108 and outputs connected to the CAN bus terminal 122 of the CAN transceiver 108. The transmitter unit 110 is configured to convert data received at the transmit input 118 of the CAN transceiver 108 to a differential signal for the CAN bus 104.

The receiver unit 112 has inputs coupled to the CAN bus terminal 122 and an output coupled to the receiver output 120 of the CAN transceiver 108. The receiver unit 112 is configured to convert a differential signal on the CAN bus 104 into data for the CAN controller 106.

In a typical application, in which a CAN network is implemented within a vehicle, a large number of CAN devices 102a-d, or nodes, may be provided. Not all these nodes will be required at any particular time. However, all active nodes will consume power. Automotive systems are typically sensitive to power consumption, especially when considering battery powered vehicles. Any extra CAN power consumption that does not result in a tangible benefit would lead to an unnecessary reduction in driving range in such examples.

A method of achieving reduced power consumption is known in the art as 'partial networking'. In a partial network scheme, nodes which are not required are turned off, or deactivated, when they are not required and reactivated when required using a wake-up indication.

The following examples described with reference to FIGS. 4 to 10 relate to CAN controllers, transceivers and methods which may be used to implement an efficient partial networking scheme in a CAN XL network. Various attributes of the CAN XL protocol and an example CAN XL transceiver are described further with reference to FIGS. 2 to 3.

Figure 2:
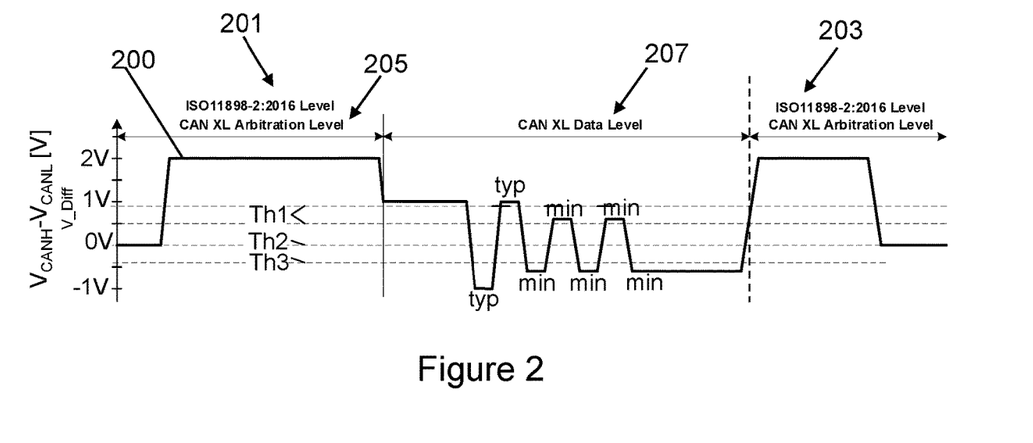
FIG. 2 illustrates a schematic of a signal on a CAN XL bus.

FIG. 2 illustrates a schematic of a signal 200 on a CAN XL bus for providing relatively high-speed data communication in a CAN network. Two different amplitude schemes in a CAN XL Frame are illustrated. The signal 200 provides a simplified CAN frame 201. The simplified CAN frame 201 comprises excerpts representing arbitration phases 203, 205 and an excerpt representing a data phase 207. The valid signal levels in the arbitration phases 203, 205 may be defined in accordance with ISO 11898-2: 2016. The data phase 207 contains data at CAN XL levels, as discussed further below. In practical examples the data phase 207 may be substantially longer than the arbitration phases 203, 205, and may comprise 2048 data bytes, for example. In particular, the level of the signal in the arbitration phase can be used to indicate whether a particular node gets access to the bus system by the CAN defined arbitration methodology using dominant and recessive bus driver levels and according receiver thresholds.

A CAN XL Transceiver will have three different threshold levels to be supported. A first threshold (Th1) is around the well-known ISO11898-2:2016 standard levels between +0.5V and +0.9V differential, used for the backwards compatible CAN arbitration.

The second threshold (Th2) is related to the fast CAN XL data communication around 0V differential, which has a minimum level of −0.1 V and a maximum level of +0.1V.

The third threshold (Th3) is used to reliably detect that there is fast CAN XL data communication on the bus lines through a threshold in the negative differential area, which has a maximum level that is lower than the minimum level of the second threshold (e.g. −0.3V . . . −0.4V).

The first and second thresholds may not be reliably used to detect fast CAN XL data communication on a bus, whereas the third threshold level may be reliably used to detect fast CAN XL data. There are at least two reasons to introduce a third comparator threshold to perform this determination—

In a first case, the nominal bus signal during no communication is 0V differential. This cannot be detected reliably using the second threshold (Th2) because noise (e.g. EMC disturbance) around the 0V may lead to a toggling output around the second threshold (Th2), which is intended to switch exactly at that threshold. Such a signal may be erroneously interpreted to be running bus traffic, while in reality the bus is idle without any traffic.

In a second case, the minimum transmitter output amplitude in fast data phase may be relatively low (e.g. 0.6V) such that in the worst case the upper limit of the first threshold (Th1) (e.g. 0.9V) cannot be reached. As such, the CAN bus would erroneously appear to be "free" when monitoring the first threshold because the first threshold Th1 is not reached by the 0.6 V signal.

If a CAN XL transceiver in a receiving node made use of either of the first threshold (Th1) or the second threshold (Th2), depending on the phase the receiving node is in, it may either see traffic when no traffic is present on the CAN bus (first case) or it may not see traffic while there is traffic on the bus (second case). Using the third, negative differential threshold (Th3) it is possible to reliably discover whether there is CAN XL bus traffic or not, regardless of the mode the receiving node is operating in.

Figure 3:
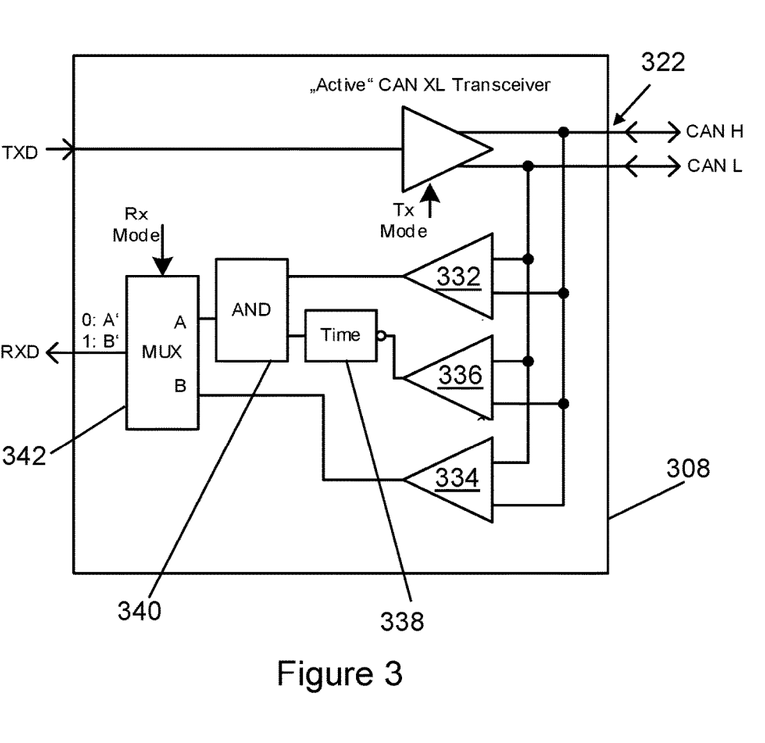
FIG. 3 illustrates an example schematic block diagram of a CAN XL transceiver.

FIG. 3 illustrates an example CAN XL transceiver 308 for communicating on a CAN XL network.

The transmitter unit of the transceiver 308 is similar to that described previously with reference to the transceiver of FIG. 1.

The receiver unit of the transceiver 308 comprises a means for comparing a signal from the CAN bus with first, second and third threshold levels (Th1, Th2, Th3). In this example, the means are provided by a first comparator 332, a second comparator 334 and a third comparator 336. Each comparator 332, 334, 336 has respective inputs coupled to a bus terminal 322 of the CAN transceiver 308 and compares a differential signal received from the inputs with a respective threshold (Th1, Th2, Th3). An optional time delay module 338 acts on an output from the third comparator 336. An AND gate 340 takes the output of the time delay module 338, or directly from the output from the third comparator 336, and an output of the first comparator 332 as its inputs. A multiplexer 342 takes the output of the AND gate 334 and output of the second comparator 334 as its inputs and provides an output in accordance with a mode of operation of the CAN transceiver 308. For example, the CAN transceiver 308 may have a slow (or normal) receive mode, which makes use of threshold levels known from known ISO11898-2:2016. In the event that the CAN transceiver 308 is operating in the fast receive mode, in CAN XL communication for example, the output of the second comparator 334 is provided as the receive output of the CAN transceiver 308. Otherwise, if the CAN transceiver 308 is not operating in the fast receive mode, the output of the AND gate 340 is provided as the receive output of the CAN transceiver 308.

In this example implementation, a dedicated receive comparator (the third comparator 336) is provided to detect CAN XL signals in the negative differential voltage area. The third comparator 336 may discover reliably that there is fast data communication on the CAN XL bus lines. Whenever fast CAN XL protocol data is present on the bus lines, one-bit level is represented with negative differential voltages on the bus. Since this is fast data communication and the CAN XL protocol has measures (bit stuffing) to prevent long phases with same physical bus levels there are no long static phases on the CAN XL bus with negative differential bus levels. For normal data, the maximum length of the period that the signal is allowed to stay lower than the third threshold level is limited by the bit stuffing rules of the CAN XL protocol.

Figure 4:
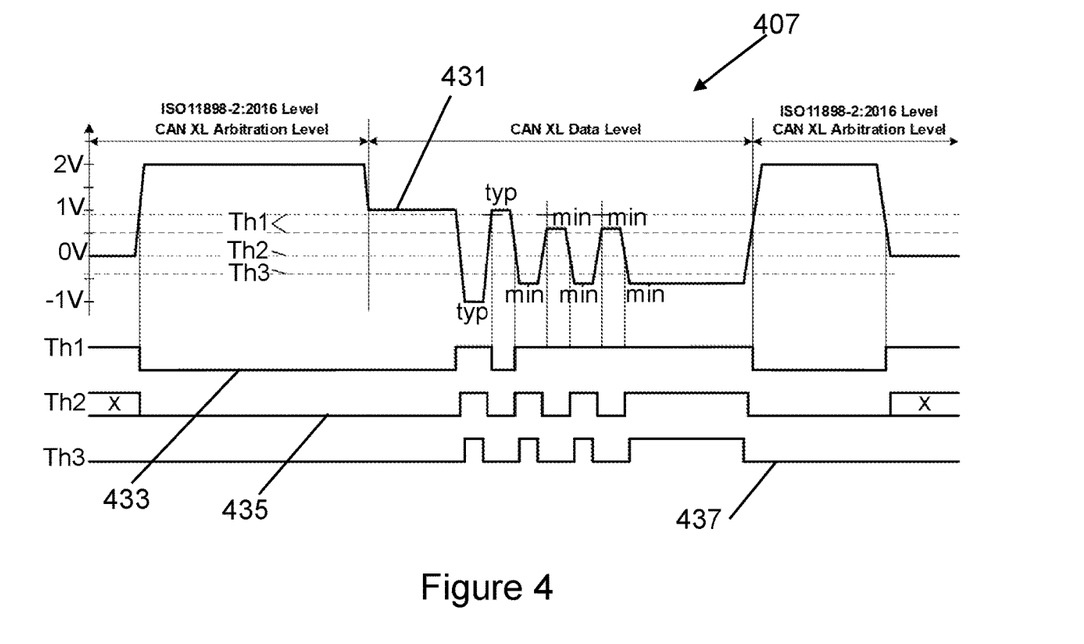
FIG. 4 illustrates profiles of a signal on a CAN XL bus and associated signals within the CAN XL transceiver of FIG. 3.

FIG. 4 illustrates profiles of a signal 431 comprising a data phase 407 on a CAN XL bus, which corresponds to that described previously with reference to FIG. 2, and associated output signals 433, 435, 437 from the respective first, second and third comparators of the CAN XL transceiver described previously with reference to FIG. 3.

Figure 5:
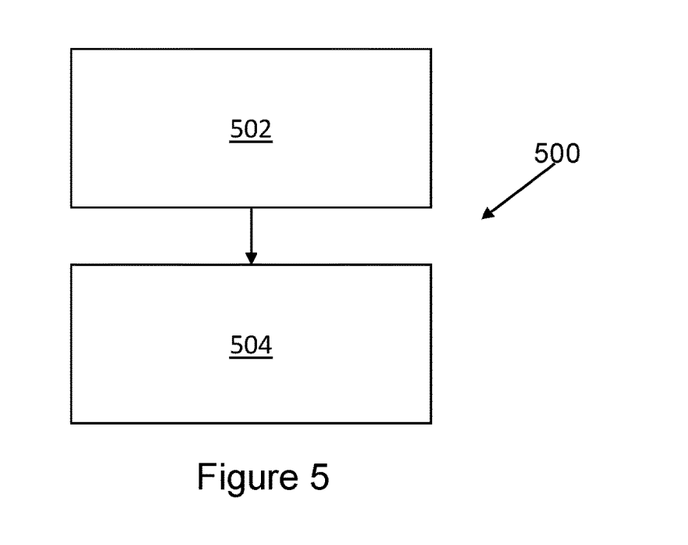
FIG. 5 illustrates a method for operating a CAN transceiver.

At least some of the embodiments described below relate to a proposed modification of the CAN XL scheme, or associated controllers or transceivers, to enable an efficient method for providing or processing a global wake-up on the CAN XL bus. The global wake-up indication indicates that all currently inactive nodes should become active, or wake-up, which may include actively monitoring data traffic on the CAN bus. FIG. 5 illustrates a method 500 for operating a CAN transceiver that is communication with a CAN controller and a CAN bus. The method 500 comprises comparing 502 a signal from the CAN bus with first, second and third threshold levels, in which the third threshold level is negative, and providing 504 a wake-up indication to the CAN controller based on the signal matching a predetermined pattern of one or more periods in which the signal is less than the third threshold level. In this way, the new physical bus levels (negative differential) introduced by the CAN XL Physical Layer may be used for wake-up management, besides other features. A negative CAN bus level, known as "level1" in CAN XL terminology, may be combined with a period, or in effect signal pattern, as a global wake-up trigger in the CAN XL bus system. Normal CAN or CAN FD traffic does not trigger the wake-up because these protocols and physical layers do not use negative differential voltage bus levels. Normal CAN XL traffic does not lead to a wake-up of nodes in Partial Networking low power mode because although it may use the negative physical bus levels, the period in which the signal is less than the third threshold level is less than the predetermined period.

Figure 6:
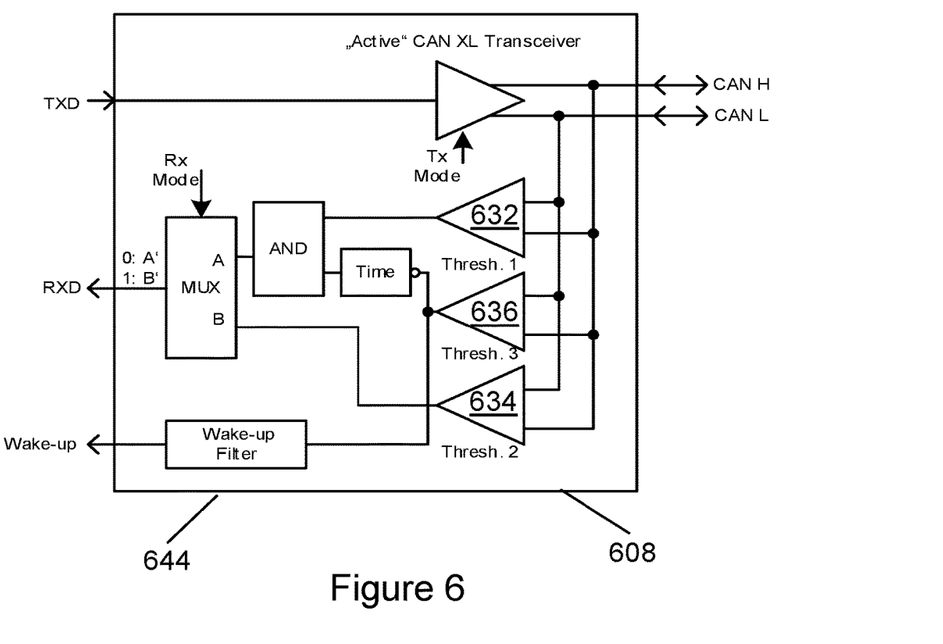
FIG. 6 illustrates an example schematic block diagram of another CAN XL transceiver.

FIG. 6 illustrates another CAN XL transceiver 608. The CAN XL transceiver 608 is similar to that described previously with reference to FIG. 3 except that it further comprises a wake-up filter 644. The wake-up filter 644 is coupled to the output of the third comparator 636. The wake-up filter 644 may be configured to provide a wake-up indication to the CAN controller based on the signal matching a predetermined pattern of one or more periods in which the signal is less than the third threshold level.

In the illustrated example, the wake-up indication is output on a dedicated pin during a low-power operating mode of a CAN transceiver. Alternatively, a dedicated PIN for wake-up may be omitted, in which case the wake-up indication is communicated from the CAN transceiver 608 to the CAN controller by other means. For example, wake-up indication may be signalled on the receive output RXD of the CAN transceiver, or any other output signal line.

A CAN controller for driving the transmit unit of a CAN transceiver, such as that described with reference to FIG. 6, may be configured to provide instructions to the CAN transceiver to transmit a wake-up indication on the CAN bus. Such a wake-up indication comprises a signal having a predetermined pattern of one or more periods in which the signal is less than the third threshold level. The CAN controller and the CAN transceiver may be provided together within a CAN device, such as a CAN XL device.

A first scheme for implementing the wake-up filter is described below with reference to FIG. 7. In this example, the predetermined pattern comprises a single period in which the signal is less than the third threshold level. The single period has a predetermined period, which is fixed with reference to the format of normal data on the CAN XL bus. In particular, the predetermined period is greater than a bit stuffing period within the data phase of a normal CAN frame so that the node can be exposed to normal CAN XL data on the bus without waking. For example, the predetermined period may be significantly longer than the expected longest CAN XL protocol related phase with a static negative differential bus voltage (CAN XL level1).

Bit stuffing is implemented in various CAN systems, including CAN XL. If the slowest anticipated data rate in CAN XL is 500 kbps and the bit stuffing rule is every $15^{th}$ bit, the longest consecutive phase with negative differential voltage is $$2000 \text{ ns} \times 15 \text{ bit time} = 30 \text{ microseconds}.$$

The CAN XL bus may therefore be set below (as in more negative than) the third threshold level for a period greater than 30 microseconds to indicate that a global wake-up of currently disabled nodes is required. In practice, this may be achieved by transmitting a "level1" as defined in CAN XL terminology using CAN XL system hardware. An advantage of some examples according to the first scheme is therefore that the exceptional symbol can be relatively short. This allows for a fast, global system wake-up based on a short message time.

Figure 7:
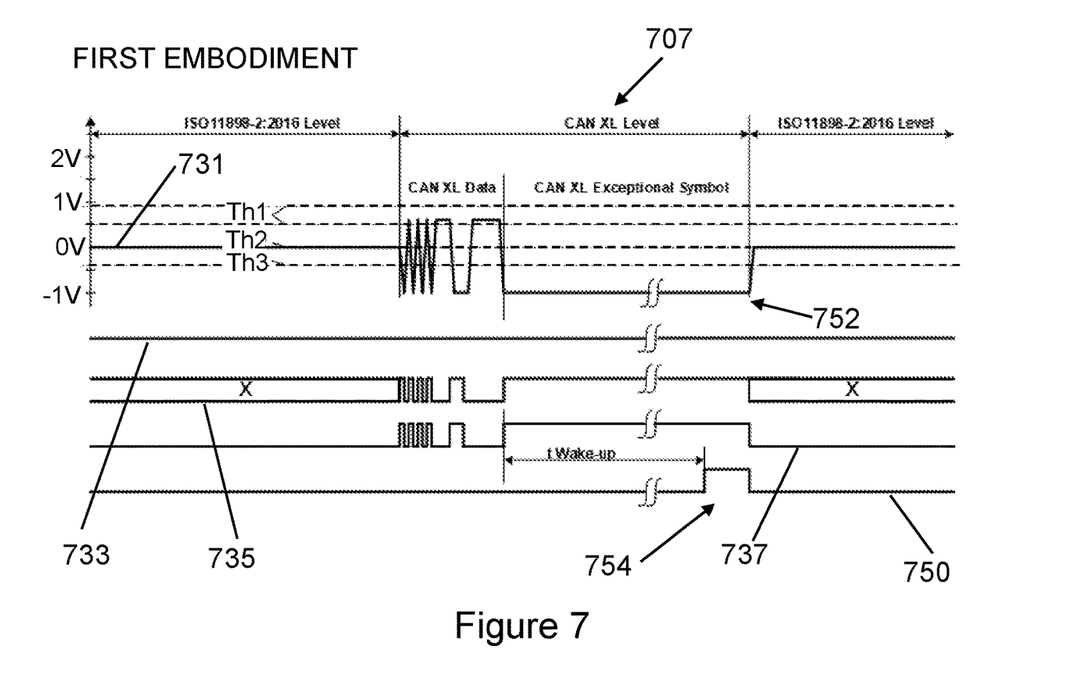
FIG. 7 illustrates profiles of a signal for a CAN XL frame comprising a wake-up indication and associated signals within a CAN XL transceiver implemented according to a first scheme.

FIG. 7 illustrates a signal 731 for a CAN XL frame comprising a wake-up indication, and corresponding outputs 733, 735, 737 of the respective comparators 632, 634, 636 shown in FIG. 6 and a corresponding output 750 of a wake-up filter according to the first scheme. Levels for the first, second and third thresholds (Th1=0.5V to 0.9V, Th2=0V, Th3=−0.4V) are illustrated, which relate to the CAN XL thresholds described previously with reference to FIG. 2.

A first portion of a data phase 707 of the CAN XL frame comprises normal CAN XL data followed by an exceptional symbol 752 providing the wake-up indication. The output of the third comparator is high when the signal 731 is less than the third threshold level, including during the exceptional symbol 752. A wake-up indication 754 is provided in the output 750 of the wake-up filter once the exceptional symbol has been present for at least a predetermined period (tWake-up). In this way, the third threshold (Th3) comparison is used in combination with a long filter timer to detect an exceptionally long period of time with negative differential voltage, which does not happen during normal CAN XL data communication because bits are toggling during the fast data phase caused at least by stuff bits in the CAN XL data signal.

The exceptional symbol 752 providing the wake-up indication may be positioned within a CAN XL frame in the "End Of Frame" CAN phase. In this phase, all nodes in the system wait for an inter frame space (11 recessive bit times with 0V differential on the bus, which is known as "Bus Idle Detection" in CAN terminology). This phase may be interrupted by the above proposed long phase, or exceptional symbol, with the negative differential voltage. This implementation shifts out the idle detection time for all nodes in the system since the RXD pin of all nodes is LOW (dominant) in this phase. For backwards compatibility reasons, the so-called "CAN Overload Frame" mechanism might be used—

In case a node receives a dominant phase at the end of a frame, this may be treated as a Bus Error Condition. Based on the Bus Error Condition, a CAN controller may increase a bus failure counter, which is defined in the CAN standard. The bus failure counter is used to identify a faulty node in the system when a node's counter value reaches a failure threshold. The receipt of a good message without a failure decreases the counter. As such, if the exceptional symbol is provided in the End of Frame phase, all nodes would treat this as an error and increase their error count unintentionally. Therefore, the CAN protocol has an option called "CAN Overload Flag". This is again treated like any other Error Frame, but it does not increase the error counters. So, there is no penalty for receiving such a symbol on the bus. As such, this mechanism may be used for the wake-up purpose. An Overload Flag is indicated by the moment it is driven to the bus. There is a particular area at the very end of the "End of Frame" phase, where the error counters are not impacted anymore so providing the exceptional symbol at the very end of the frame may be preferable in some implementations of a global wake-up symbol. However, this may not cause any other effects other than lengthening the waiting time towards IDLE state.

It will be appreciated that in some examples the CAN frame containing the exceptional symbol may not convey any further CAN data. That is, a phase containing the exceptional symbol may be provided immediately after the arbitration phase. On the one hand, such a phase may be considered to be a data phase of the CAN frame that consists exclusively of the exceptional symbol, and does not include any CAN data. In such a case, the data phase of the CAN frame may be considered to be co-extensive with the exceptional symbol. On the other hand, such a phase may be considered to be an exceptional phase and the CAN frame containing the exceptional phase may not contain a data phase. That is, the exceptional phase replaces the data phase. Such frames may provide an "empty" frame just containing just the wake-up symbol.

In examples according to the first scheme, the CAN XL protocol controller needs to support sending exceptional symbols in which the negative differential voltages (CAN XL level1) on the bus lines is held for a period greater than the stuffing rate period. As such, there is a slight increase in the complexity of the protocol implementation.

A second scheme for implementing the wake-up filter is described below with reference to FIGS. 8 and 9. Instead of sending an exceptional symbol on the CAN bus, a standard conforming CAN XL frame provides a global wake-up indication.

In examples according to the second scheme, the predetermined pattern comprises a plurality of separate periods in which the signal is less than the negative threshold level (CAN XL level1). The plurality of separate periods may be provided within a single CAN frame or a plurality of CAN frames. CAN data frames may be provided with dedicated data content such that the signal is below the third threshold level for a specific proportion of the frame time. In this way CAN data frames that provide a wake-up indication may be provided within the framework of the CAN XL protocol without increasing the complexity of the protocol whilst still enabling wake-up detection by the wake-up filter of a CAN transceiver such as that illustrated in FIG. 6 without requiring complex processing. A relatively simple filter in the transceiver may be able to sort out the protocol-required stuff bits while reliably detecting a global wake-up message on the bus lines. A global wake-up indication may therefore be provided without the need to modify the protocol applied by the CAN controller to allow exceptional symbols as described for the first scheme.

For example, assuming a MAX data rate of 15 Mbps (66 ns per bit) for a fast CAN data frame, a MAX payload of 2048 bytes per data phase and a stuff bit every $15^{th}$ bit, the CAN bus stays in the data field for 2048×8×66 ns=1.08 ms (stuff bits do not significantly contribute to this time). By sending a long fast data frame with all bits with negative differential bus representation (CAN XL level1), a filter time of 1 ms may be implemented. The stuff bits may be ignored by an asymmetrical receiver wake-up filter in the transceiver.

The communication of a normal frame within the old level scheme (Classical CAN/CAN FD/CAN FD SIC) does not lead to a global wake-up signal because the ratio of time at negative voltage (below the third threshold) is not met. In this way, backwards compatibility with existing CAN systems may be maintained.

In order to reduce the probability of unwanted wake-up detection by random application traffic, a wake-up filter should be selected to have a long accumulation time to accommodate a long data pattern. Best robustness would be achieved through a filter that runs across many data bytes. Therefore, the longest possible data payload of 2048 data bytes may be used at the highest expected data baud rate. About 1 ms of overall filter time might be a good selection. Shorter times are possible as well but increase the risk for unwanted global wake-ups, especially at lower data baud rates. The lower the used data baud rate, the less data bytes that are available within a given filter time. In some examples, the filter time may be configured to adapt to the used baud rate in the system. That is, the filter period may be set in accordable with the prevailing data rate of the CAN bus. As an alternative to an absolute filter time, a number N of required "symbols in a row" of 15:1 (if this is the stuffing condition) may be defined. With that, the filter is baud rate independent. N might be configurable as well to increase the robustness against unwanted wake-ups.

In one example in accordance with the second scheme, the global wake-up pattern is provided by a data frame which maximizes the time with negative differential voltage. In this example, all data bits have the same level and are interrupted by the CAN XL stuff bits only. In such a case, the data phase may consist entirely of the global wake-up pattern and not convey any further CAN data. An asymmetrical wake-up filter may be used to detect the duty cycle on the third threshold comparator output in FIG. 6 by, in effect, masking out the stuff bits.

The wake-up filter may be configured to:
  determine a first period of time at which the bus is below the third threshold level;
  determine a second period of time at which the bus is not below the third threshold level;
  determine whether the signal matches a predetermined pattern based on a ratio of the first period of time against the second period of time matching a predetermined ratio.

Such measurements and determinations may be performed within a single CAN frame, and in particular within a single data phase of the CAN frame.

If the ratio does not match the defined stuff rule (e.g., 15:1), a timer or counter of the wake-up filter may be cleared.

If the ratio is in accordance with the stuff rule during the data phase, the timer or counter continues to run until a threshold value is reached, indicating that a wake-up indication is present.

That is, the wake-up filter may be configured to measure the expected signal ratio on the third comparator output signal and if the ratio fits the wake-up ratio criterion (e.g. 15:1 if this is the stuffing rule) the filter timer continues to run (or the counter N inside the wake-up filter continues to count). Conversely, any signal ratio deviation resets the filter timer (or the counter N). A predetermined length of consecutive sequence of symbols with the correct ratio may lead to a filter timer overflow (or counter reaching a pre-defined threshold) triggering the wake-up.

The operation of such a wake-up filter is discussed below with respect to FIGS. 8 and 9.

Figure 8:
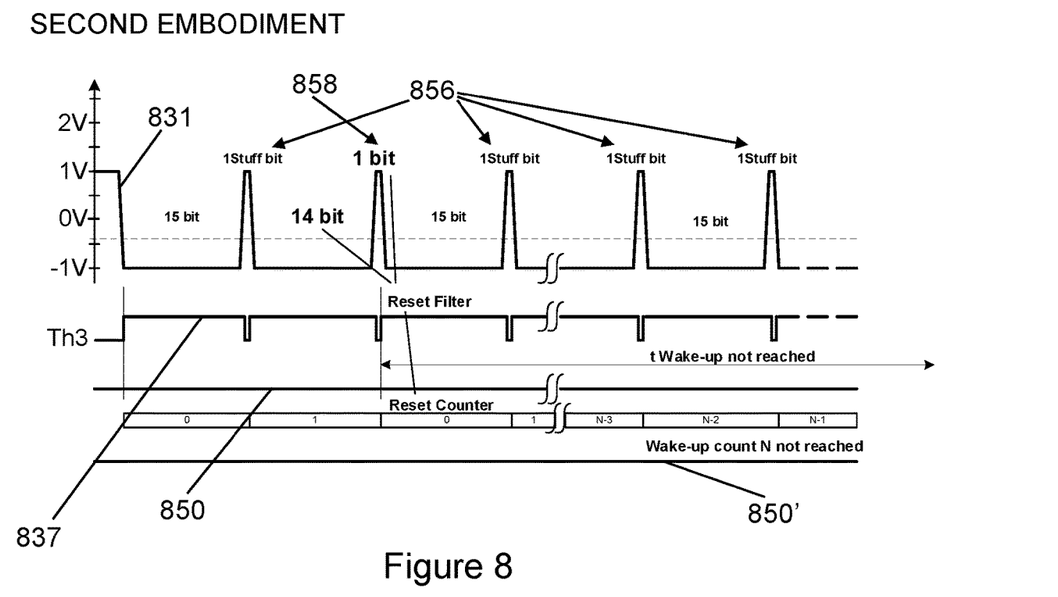
FIG. 8 illustrates profiles of a signal for a CAN XL frame not comprising a wake-up indication and associated signals within a CAN XL transceiver implemented according to a second scheme.

FIG. 8 relates to the case in which a normal data load is provided (including one data bit 858) in the CAN bus signal 831 in addition to stuff bits 856. FIG. 8 illustrates a signal for a CAN XL data frame, a corresponding output 837 of the third comparator shown in FIG. 6, and corresponding outputs 850, 850' of a wake-up filter according to the first scheme. A level for the third threshold (Th3=−0.4V, in this example) is illustrated.

In this example, the presence of the data bit 858 causes a filter timer to be reset in a timer variant of the filter, and as such a wake-up indication is not provided in the output 850 of the timer-variant wake-up filter because a threshold period is not reached. Likewise, the presence of the data bit 858 causes a filter counter to be reset in a counter variant of the wake-up filter, and as such a wake-up indication is not provided in the output 850' of the counter-variant wake-up filter because a threshold count is not reached.

Figure 9:
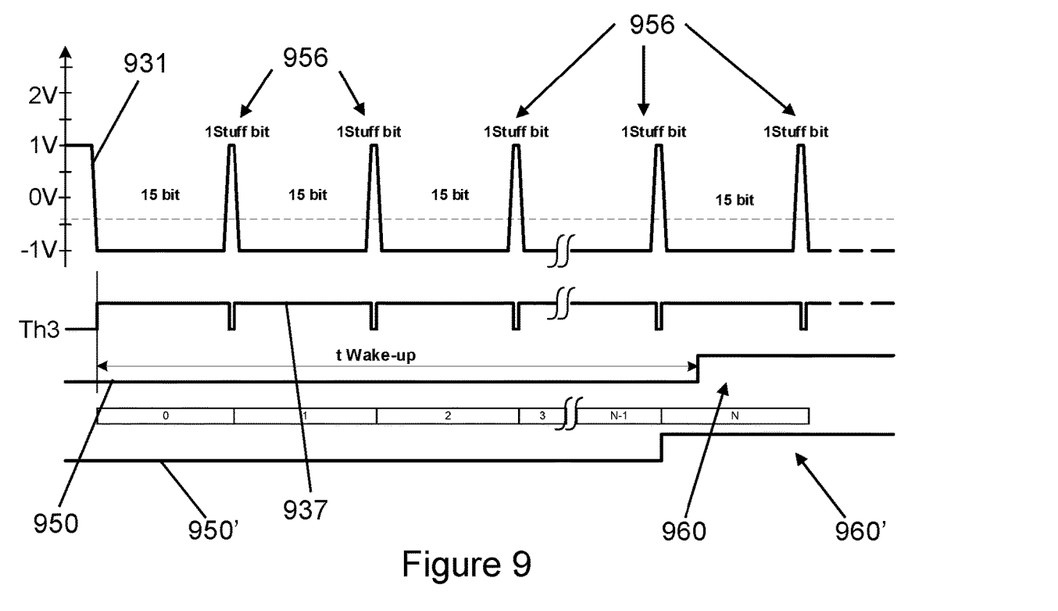
FIG. 9 illustrates profiles of a signal for a CAN XL frame comprising a wake-up indication and associated signals within a CAN XL transceiver implemented according to the second scheme.

FIG. 9 relates to the case in which a wake-up indication is provided due to the use of a particular bit pattern. FIG. 9 illustrates a signal 931 for a CAN XL data frame comprising a wake-up indication, a corresponding output 937 of the third comparator shown in FIG. 6, and corresponding outputs 950, 950' of a wake-up filter according to the first scheme. A level for the third threshold (Th3=−0.4V, in this example) is illustrated.

The particular bit pattern comprises the signal 931 being held below the third threshold level, other than for the provision of stuff bits 956, for a predetermined period. In this way, the ratio of first and second periods matches the expected ratio for a wake-up indication. A wake-up indication 960 is provided in the output 950 of the timer-variant wake-up filter because the threshold period is reached. Likewise, a wake-up indication 960' is provided in the output 950' of the counter-variant wake-up filter because a threshold count is reached.

It will be appreciated that there are various ways to implement a wake-up filter in accordance with the second scheme. In order to cope with tolerances, a robust implementation of the second filter may be provided by a digital state machine.

Figure 10:
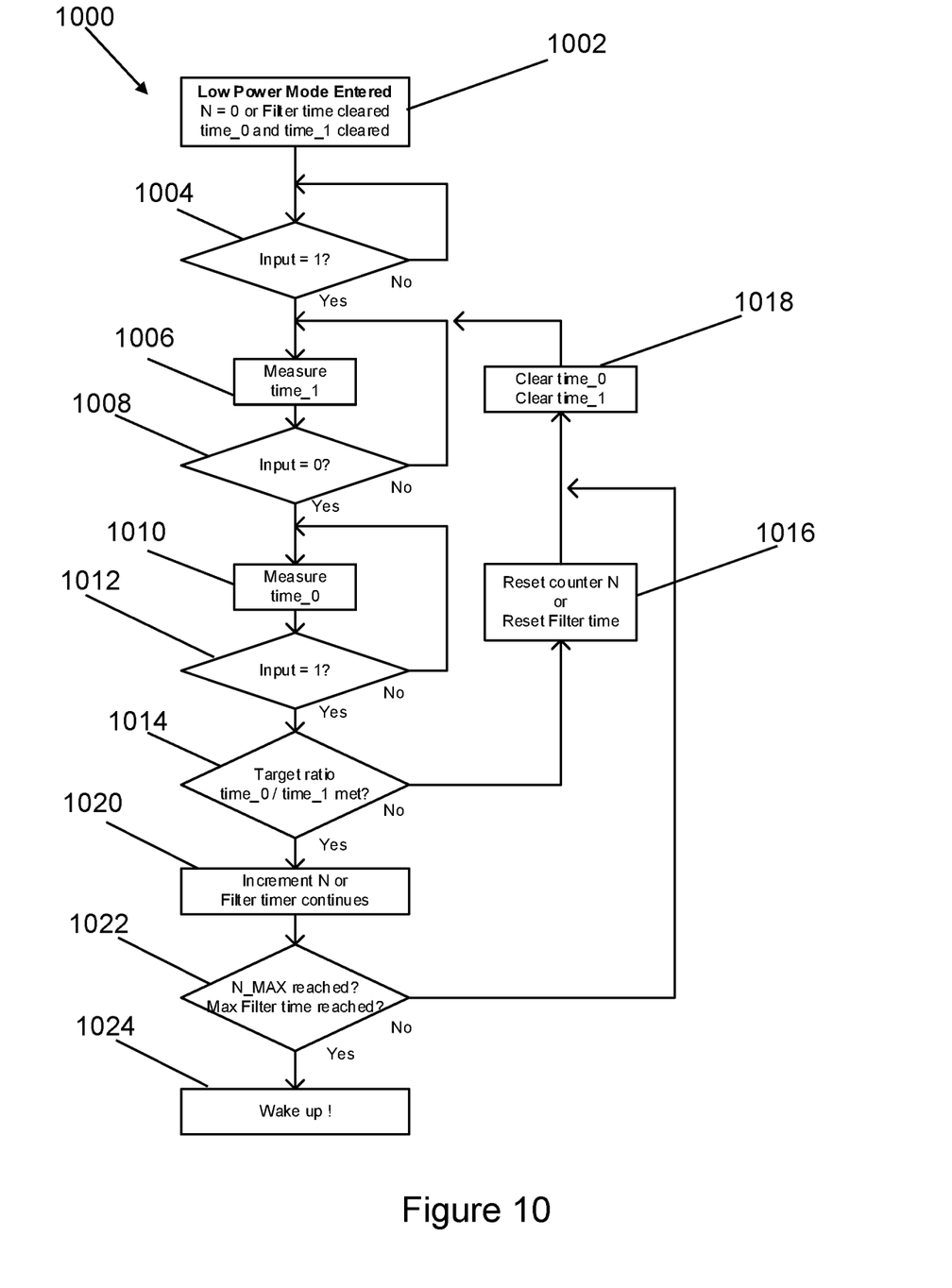
FIG. 10 illustrates a schematic flow diagram for a state machine implementation of a wake-up filter.

FIG. 10 illustrates a schematic flow diagram 1000 for a state machine implementation of a wake-up filter according to the second scheme, which may be implemented using either a counter register or timer. On entry into a low power mode 1002, the counter register (N) or timer value is cleared or reset, and a value for a first time period at which the third threshold level (CAN XL level 1) is met (time_1) and a value for a second timer period at which the negative, third threshold level (CAN XL level1) is not met (time_0) are also cleared or reset.

The state machine then proceeds to test the condition 1004 whether a differential signal on the CAN bus $V_{CAN}$ is less than the third threshold level (Th3) (input=1 ?). That is, is a negative signal (e.g. CAN XL level1) present on the CAN bus. If this condition 1004 is not met, the step is repeated. If this condition 1004 is met, a period of time at which the third threshold level is met is measured 1006. The measurement continues until the third threshold level is no longer met. That is, the state machine tests the condition 1008 whether the differential signal on the CAN bus $V_{CAN}$ is greater than or equal to the third threshold level (input=0?) and continues the measurement 1006 of the first period (time_1) if the condition is not met. If the condition step 1008 is met, then a second period (time_0) in which the third threshold level is not met is measured 1010. The measurement of the second period (time_0) at which the threshold level is not met continues until the threshold level is met again. That is, the state machine determines 1012 whether the third threshold level is met (input=1 ?), and if the condition is not met the measurement 1010 of the second period (time_0) continues. If the condition 1012 is met, the state machine proceeds to determine at step 1014 whether a target ratio of the period of time at which the third threshold level is not met divided by the period of time at which the third threshold level is met (time_0 divided by time_1) is itself met. If the target ratio is not met, the counter register N or filter time is reset 1016 and the time period at which the third threshold level is not met and the time period at which the third threshold level are met (time_0, time_1) are cleared/reset, and the state machine proceeds to measure the period of time that the third threshold level is met at step 1006.

If the target ratio at step 1014 is met, the counter register N of detected cycles is incremented, or the filter timer is allowed to continue 1020.

It is then determined whether a threshold value (N_max) of the counter register N, or a threshold filter time of the filter timer, has been reached 1022. In the event that the relevant maximum value is not reached, the state machine reverts to clearing 1018 the second period during which third threshold level is not met (time_0) and the first period during which the third threshold level is met (time_1). In the event that the relevant maximum value is reached, an indication to wake-up is generated 1024.

In general, reference to CAN herein may be a reference to any CAN variant unless an intention to the contrary is apparent, for example by reference to a particular ISO standard.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microprocessors, processor modules or subsystems (including one or more microprocessors or microprocessors), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microprocessor, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A controller area network (CAN) transceiver for communicating with a CAN controller and a CAN bus, the CAN transceiver configured to:
compare a signal from the CAN bus with a negative threshold level; and
provide a wake-up indication to the CAN controller based on the signal matching a predetermined pattern of one or more periods in which the signal is less than the negative threshold level.

2. The CAN transceiver of claim 1, comprising:
a comparator configured to compare a differential signal from the CAN bus with the negative threshold level; and
a wake-up filter configured to receive the output of the comparator and determine whether the output corresponds with the predetermined pattern.

3. The CAN transceiver of claim 1, in which the predetermined pattern is a single period having a predetermined duration.

4. The CAN transceiver of claim 3, in which the predetermined duration is greater than a bit stuffing period within a data phase of a CAN frame.

5. The CAN transceiver of claim 3, in which the period is at the end of a CAN frame or at the end of a data phase of a CAN frame.

6. The CAN transceiver of claim 1,
wherein the transceiver is configured to receive, in a data phase of a CAN frame having a data phase consisting exclusively of the predetermined pattern; and
wherein the CAN frame does not include any CAN data traffic.

7. The CAN transceiver of claim 1, in which the predetermined pattern comprises a plurality of separate periods in which the signal from the CAN bus is less than the negative threshold level.

8. The CAN transceiver of claim 7, configured to:
determine a first period of time during which the signal from the CAN bus is below the negative threshold level;
determine a second period of time during which the signal from the CAN bus is not below the negative threshold level;
determine whether the signal from the CAN bus matches a predetermined pattern based on a ratio of the first period of time to the second period of time matching a predetermined ratio.

9. The CAN transceiver of claim 8, in which the second period of time follows immediately after the first period of time, configured to:
determine that the signal matches the predetermined pattern when a predetermined number of cycles of the first and second periods have been detected in which the ratio of the first period of time to the second period of time matches the predetermined ratio.

10. The CAN transceiver of claim 9, in which the predetermined number is determined by counting or timing the number of consecutive cycles at which the ratio of the first period of time to the second period of time matches the predetermined ratio.

11. The CAN transceiver of claim 3, in which the predetermined pattern is determined for a single CAN frame.

12. The CAN transceiver of claim 7, in which the predetermined pattern corresponds to legal data in the CAN protocol.

13. A controller area network (CAN) controller for driving a CAN transceiver configured to provide a signal to a CAN bus, the signal being characterized by a signal level defined with respect to a negative threshold voltage level, the CAN controller configured to:
provide instructions to transmit a wake-up indication on the CAN bus, in which the wake-up indication comprises a signal having a predetermined pattern of one or more periods in which the signal level is less than the negative threshold voltage level.

14. A Computer program product comprising a nontransitory storage medium storing executable instructions configured, when executed by a processor of a CAN controller, to cause the CAN controller to:
cause the CAN transceiver to transmit a wake-up indication on the CAN bus, the wake-up indication comprising a signal having signal level defined with respect to negative threshold voltage level and having a predetermined pattern of one or more periods in which the signal level is less than the negative threshold voltage level.

15. The CAN transceiver of claim 1, wherein the transceiver is configured to utilize a predetermined negative voltage as the negative threshold level.

16. The CAN transceiver of claim 2, wherein the transceiver is configured to utilize a predetermined negative voltage as the negative threshold level.

\* \* \* \* \*